Figure 1:
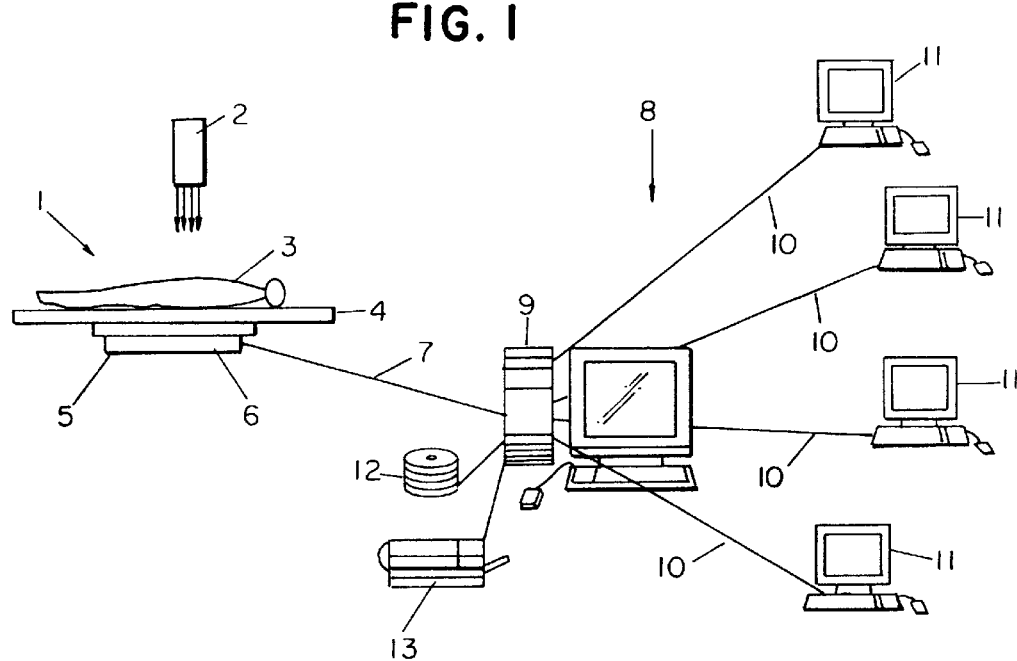

United States Patent
Laupper et al.

[11] Patent Number: 5,920,604
[45] Date of Patent: Jul. 6, 1999

[54] OPTICAL ARRANGEMENT AND PROCESS FOR TRANSMITTING AND CONVERTING PRIMARY X-RAY IMAGES

[75] Inventors: Ruedi G. Laupper, Hitzkirch; Peter Wägli, Bremgarten, both of Switzerland

[73] Assignee: Teleray AG, Hitzkirch, Sweden

[21] Appl. No.: 08/860,754
[22] PCT Filed: Dec. 19, 1995
[86] PCT No.: PCT/CH95/00300
  § 371 Date: Sep. 19, 1997
  § 102(e) Date: Sep. 19, 1997
[87] PCT Pub. No.: WO96/22654
  PCT Pub. Date: Jul. 25, 1996

[30] Foreign Application Priority Data

Jan. 20, 1995 [CH] Switzerland ............... 156/95

[51] Int. Cl.⁶ ............................................. H04N 5/32
[52] U.S. Cl. ........................... 378/98.3; 378/98.12
[58] Field of Search ........................ 378/98, 98.2, 98.3, 378/98.12, 98.8

[56] References Cited

U.S. PATENT DOCUMENTS

| | | | |
|---|---|---|---|
| 4,628,356 | 12/1986 | Spillman et al. | 378/98.8 |
| 5,308,986 | 5/1994 | Walker | 250/370.11 |
| 5,404,387 | 4/1995 | Hammond et al. | 378/98.3 |
| 5,412,705 | 5/1995 | Snoeren et al. | 378/98.3 |
| 5,617,463 | 4/1997 | Beierlein | 378/98.3 |
| 5,682,411 | 10/1997 | Rushbrooke et al. | 378/98.3 |
| 5,724,402 | 3/1998 | Grady | 378/98.3 |

FOREIGN PATENT DOCUMENTS

| | | |
|---|---|---|
| 0260754 | 3/1988 | European Pat. Off. . |
| 0262267 | 4/1988 | European Pat. Off. . |
| 0286393 | 10/1988 | European Pat. Off. . |
| 0618719 | 10/1994 | European Pat. Off. . |
| 4034358 | 1/1992 | Germany . |
| 91/14338 | 9/1991 | WIPO . |
| 94/09391 | 4/1994 | WIPO . |

*Primary Examiner*—David P. Porta
*Attorney, Agent, or Firm*—Shoemaker and Mattare, Ltd.

[57] ABSTRACT

An optical arrangement and a process for transmitting and converting X-ray images generated on a two-dimensional primary image array (21a) with light emission within the visible spectrum contains a plurality of optical systems (17) for reduced imaging of a sectional image (19) corresponding to an individual segment (19) of the primary image (20). The imaging is effected through an optical image guide (22). At least two image guides (22) are joined to combine sectional images into first images (19b). Each first image then contains at least two segments (19, 19a) of the primary image (20). The image guides (22) on the output side are connected to the input of a converter (28) by which the light signals are converted into processable electrical signals.

14 Claims, 5 Drawing Sheets

FIG. 8

IMAGE RECORDING

IMAGE RECORDING AND READING OUT OF THE IMAGES IN A MEMORY. READING IN THE CORRECTION VALUES OF THE OPTIC FROM THE MEMORY. → JOINING TOGETHER THE INDIVIDUAL IMAGES AFTER THE CORRECTION. FINE TUNING OF EVENTUAL DRIFTS BY POST-CORRECTIONAL COMPUTATION IN THE OVERLAPPING ZONES. → REPRESENTATION OF THE PROCESSED IMAGE AND ITS MEMORY.

MEMORY FOR THE CORRECTION VALUES.

CALIBRATION

EVALUATION OF THE DISTORTION AND THE BRIGHTNESS DISTRIBUTION IN THE INDIVIDUAL FIELDS BY RECORDING A SPECIAL TEST PATTERN. → CALCULATION OF THE CORRECTIONS IN INDIVIDUAL IMAGE SEGMENTS. CALCULATION OF THE OVERLAPPING. CALCULATION OF THE CORRECTION VALUES FOR ADAPTING THE INDIVIDUAL IMAGES. → STORING THE CORRECTION VALUES IN A NON-VOLATILE MEMORY.

OPTICAL ARRANGEMENT AND PROCESS FOR TRANSMITTING AND CONVERTING PRIMARY X-RAY IMAGES

The invention relates to an optical arrangement and method for transmitting and converting X-ray primary images.

X-ray pictures in the region of visible light are traditionally produced on surfaces which turn the X-ray beams modulated by the irradiated object into visible light. For this, scintillation sheets are generaly commonly employed. Sheets of this type contain e.g. caesium iodide. Alternatively,. other primary image arrangements, as e.g. laminated glass or laminated plastic sheets are also conceivable.

For television transmission of X-ray images, television cameras have already also been employed. With this, an X-ray image intensifier is used which receives the X-ray beams modulated by the irradiated object and reproduces an intensified output image via an optic of great light transmitting capacity on the projection surface of a television camera. The television camera delivers electrical signals, which are reconverted in the monitor to the irradiated image. At the same time, the image intensifier consists of an evacuated tube, on whose end side there is located an X-ray fluoroscopic screen as a primary image arrangement. Directly behind this, there is located the photocathode from which electrons exit after incidence of light, the number of which being proportional to the excitation of the fluorescent screen by way of the X-ray beams. An image intensification arises in that the emitted photo-electrons are accelerated by an electric field and excite the oppositely lying output fluorescent screen to several intensified illuminations. The output image may be transmitted to the input optic of the television receiver tube in many ways. Electrostatic images e.g. are known, with which the image on the input window is reduced electron-optically onto the output window and is thus adapted to the window of the camera. It may also be transmitted by way of an optical lens arrangement, in which the output image of the image intensifier lies in the focal plane of the first objective, wherein the image is produced in the focal plane of the camera objective. Instead of the optical transmission, the image may be transmitted from the output side of the image intensifier also by way of fiber optics to the input optic of the television camera.

Such television systems are extraordinarily complicated, require specially adapted X-ray apparatus and due to the large space requirements, may not be integrated into standard X-ray apparatus.

In practice therefore laser-image sytems are mostly applied in order to convert X-ray pictures into electrical signals and to store or to transmit the image signals, or to process them in other ways. With laser-image systems memory sheets are primarily applied which store the modulated X-ray irradiation in a metastable condition. The sheets are excited to illuminate by way of a HeNe laser. In this way, the signal can be electron-optically converted. Alternatively conventionally exposed sheet may also be "scanned". With this then, the primary image is produced on the sheet or film, this permitting the application of conventional film cassettes ("Bucky's"). On the other hand with such arrangements no online transmission is possible, and otherwise for conversion, a separate scanning procedure is required.

It is the object of the invention to provide an arrangement and a method which permits the on-line acquisition and transmission as well as representation of X-ray images in an economically simple manner, and also to technically permit the later retrofitting of conventional X-ray apparatus By way of an arrangement of a multitude of optical systems for the reduced imaging, in each case of a field corresponding to a single segment of the primary picture, on an optical image guide, the invention achieves a low constructional size as well as a high image resolution. As optical systems, lens arrangements may be employed which are advantageously arranged in a matrix manner in rows and columns. The image guides assigned to the individual lens arrangements or objectives may on the output side be grouped in columns or rows. Alternatively as optical systems, gradient-index-lenses or microlenses may be employed. With conventional lenses with a homogeneous index of refraction, the light rays are bent on the surface, that is, in the region of transition of the index of refraction. With "gradient-index material" the index of refraction of the lens material itself is different, so that the light is continuously refracted in the material and additionally is refracted in a defined manner oh the surface. So-called "Selfoc lenses" marketed by NSG America, Inc. (Somerset, N.J. 08873) or the Nippon Sheet Glass Co. Ltd., Tokyo are particularly suitable for the application according to the invention. Their application in "fiberscopes" and "endoscopes" is common.

Simple technical adaptability and a small constructional size, according to the invention, are above all further improved in that the image intensifier and the transducer for converting the light signals into electrical signals which can be processed, are connected to the optical system by way of an image guide. In this way the transducer can be arranged at a distance from the optical system. Moreover, a releasable connection may be provided with which the image guide may be releasable connected to the image intensifier. In this manner for example, a transducer and/or an image intensifier may be alternately connected to various optical systems, by which means the costs of the arrangement are reduced. Above all, this is achieved in that for a multitude of optical systems, only a relatively expensive image intensifier and a transducer, in particular a camera, must be provided.

In order to concentrate the output of the image intensifier with a relatively large surface onto the input of the camera, and to correspondingly bundle the light beams, preferably a taper is provided. With this, as a taper, an image guide bundle is provided which on the input side acquires a larger surface than on the output side.

According to a modified imaging, it is possible to firstly expand the image with a taper and after the image intensifier, again to image with a taper onto the CCD array. In this way, on the image intensifier which limits the resolution, a large as possible image is produced. Thus the limiting of the resolution may be reduced: the cross section of the image guide may be made small, by which means the costs are reduced. With a 2nd taper an optimal adaptation to the CCD array may be achieved.

The optical systems and the image guide may, according to the invention, be arranged in an optic housing which is provided as a replacement for the rear wall of a bucky of an X-ray installation With this, the image intensifier and transducer may be connected to the bucky or the optic housing with a releasable plug attachment.

By way of the grouping together of the image guides, which in each case transmit individual segments of the primary image, combinations of fields may be grouped together to intermediate images, wherein each intermediate image contains at least two segments of the primary image. In this manner, above all, the construction and the optics of the image intensifier are simplified. If for example four roughly quadratic individual segments of a row or column are grouped together to an intermediate image, then this may be represented such that again a quadratic intermediate image arises, whose four quadrants in each case correspond to an individual segment of the primary image. The image signals given out by the camera may at the same time be simply assigned to the individual segments of the primary image or the individual segments or quadrants of the intermediate image, so that the processing in the computer installation in the sense of a combination of the intermediate images into complete seconary images is possible without further ado.

If the optical systems are arranged relocatable relative to the primary image arrangement, according to the invention, smaller or larger segments of the primary image may be imaged. With a representation of a cutout of the primary image by way of the optical systems (zoom function), it is achieved that the resolution of the secondary image is increased.

The processing in the computer installation may be effected in a conventional manner, e.g. the signals combined to the secondary image may be divulged to a terminal or to several terminals, the signals may be stored or secondary images may be outputted as a hard copy, e.g. via a plotter. In any case, all primary images are convertible on-line into secondary images and from the recording to the representation only a few seconds pass, according to the power ability of the computer installation employed.

Figure 2:
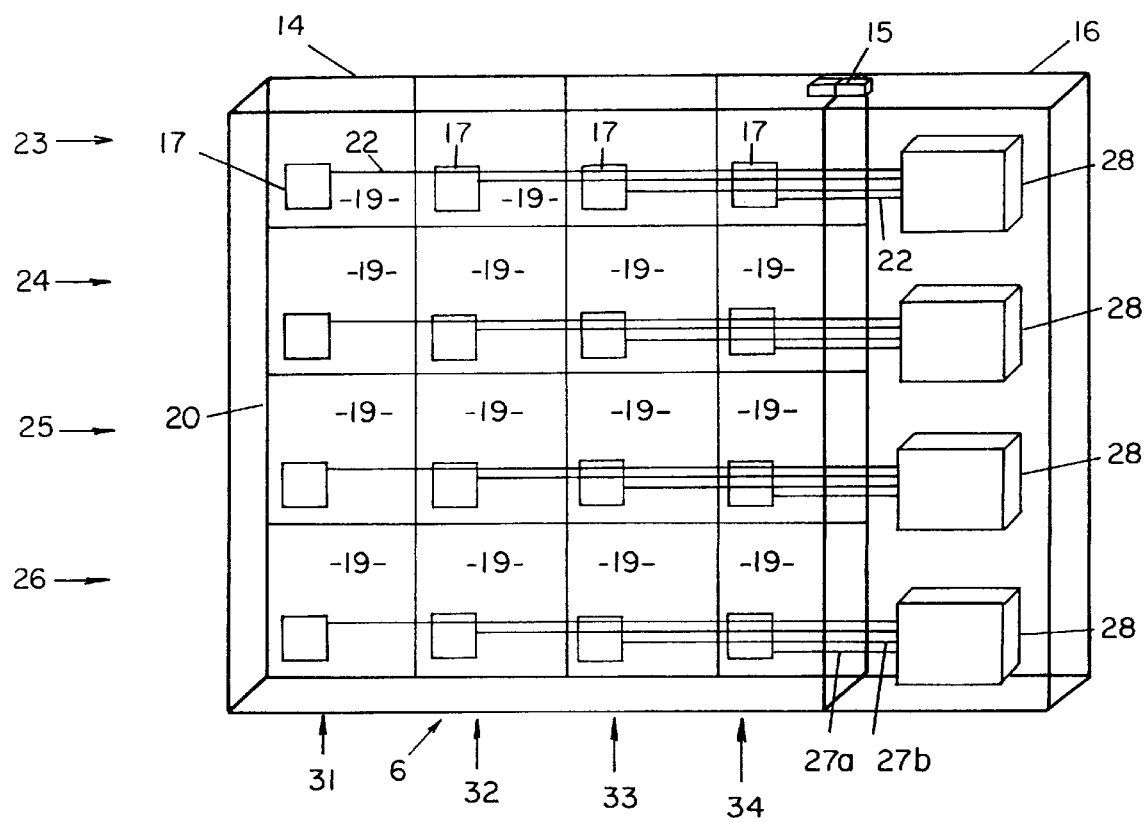
Figure 3:
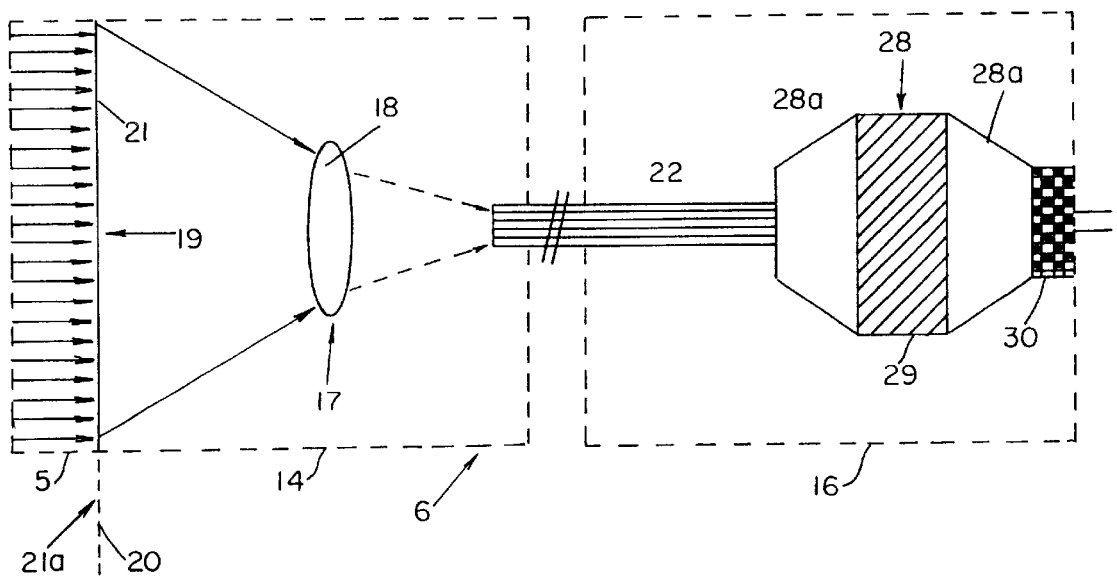
Figure 4:
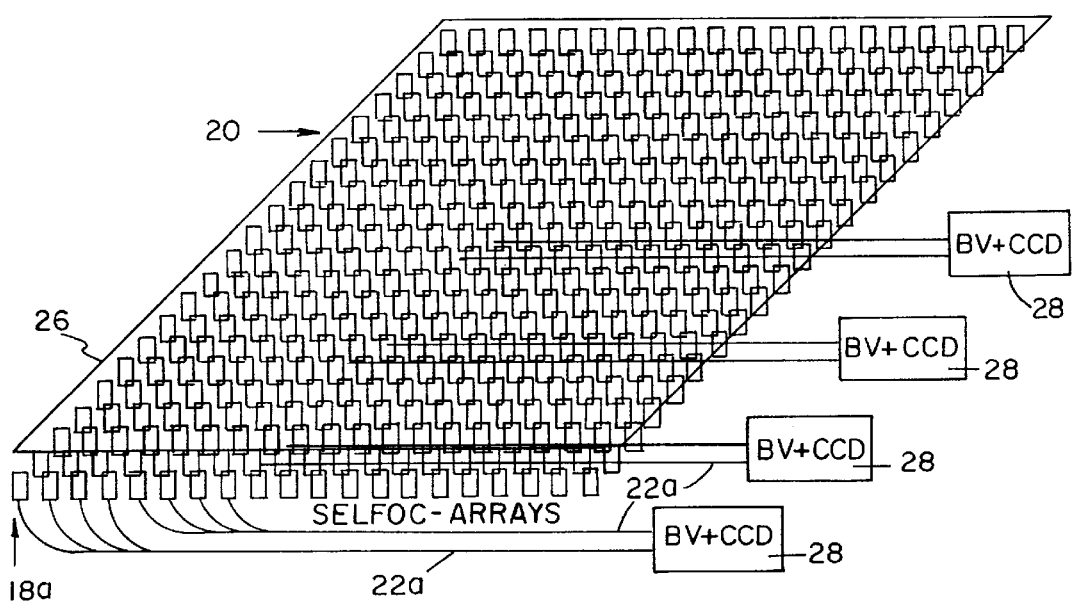
Figure 5A:
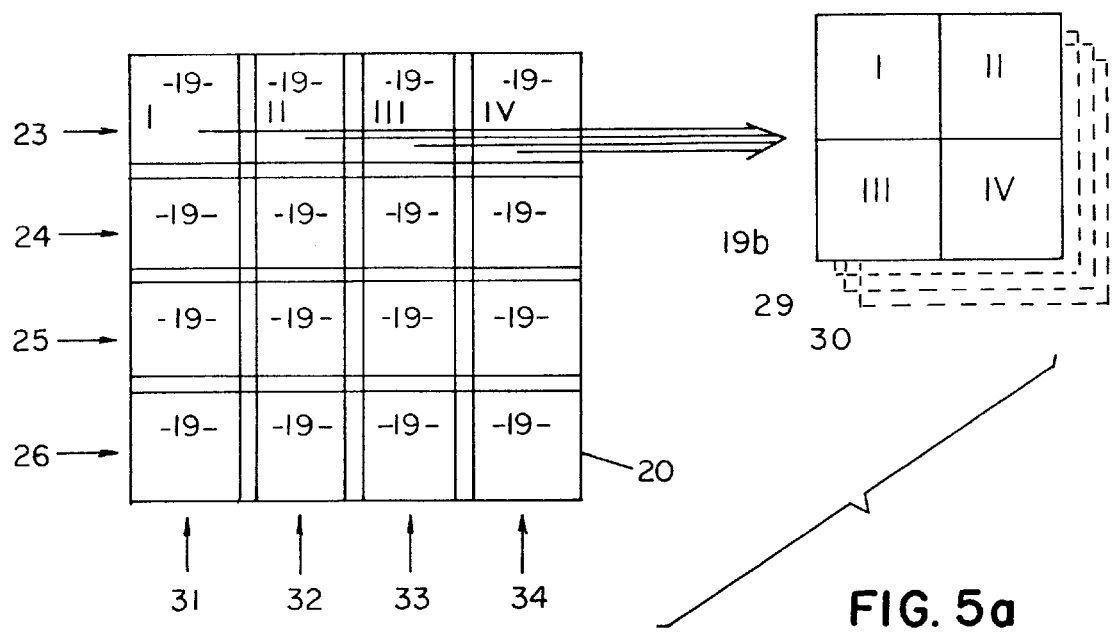
Figure 5B:
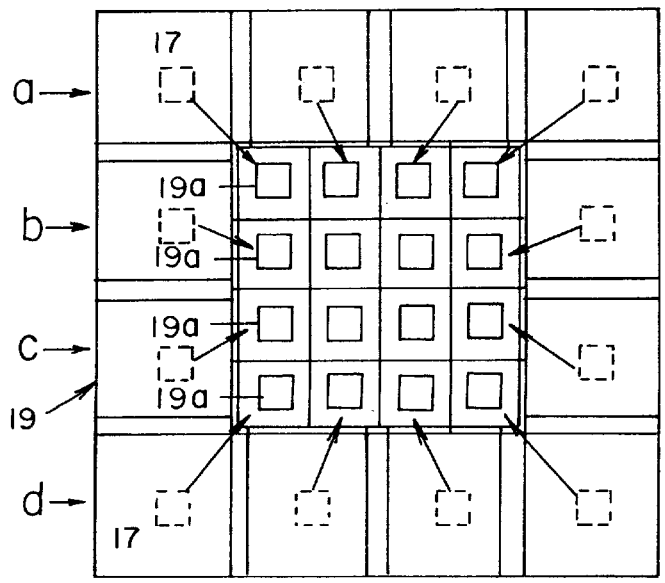
Figure 6:
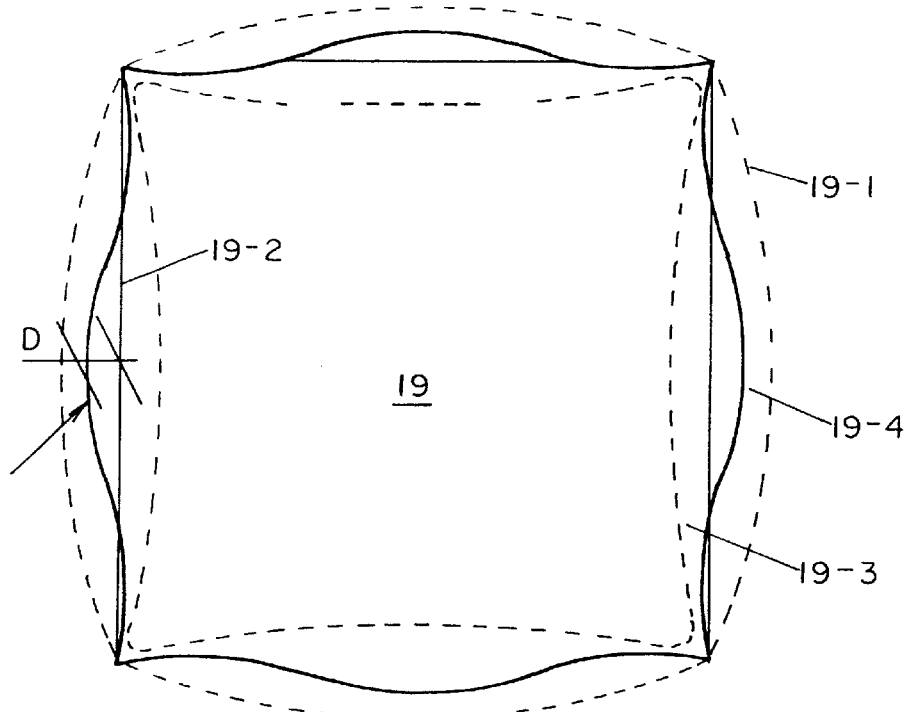
Figure 7:
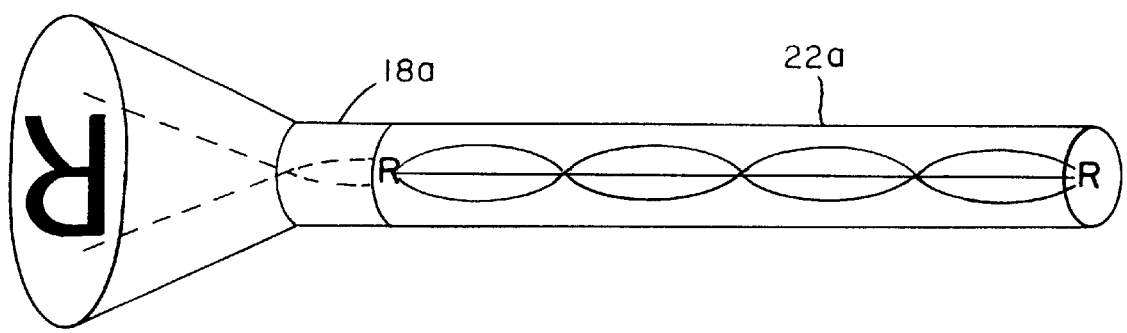

The invention is hereinafter described in more detail in embodiment examples by way of the drawings. There are shown:

| | |
|---|---|
| FIG. 1 | the schematic representation of an optical arrangement for transmitting and converting X-ray images, in combination with a computer installation, |
| FIG. 2 | the schematic representation of an optical arrangement according to FIG. 1 in a plan view, |
| FIG. 3 | the schematic arrangement of the beam path of the arrangement according to FIG. 2, |
| FIG. 4 | a modified embodiment example of an optical arrangement, |
| FIG. 5a | the schematic representation of the breaking down of the primary image into individual segments and their grouping together into intermediate images, |
| FIG. 5b | in plan view, an arrangement according to FIG. 5a and FIG. 2, in which the optical systems are displaced parallelly and perpendicularly to the primary image arrangement in order to image a smaller cutout of the primary image, |
| FIG. 6 | the transmitting characteristics of the fields in an optical arrangement according to FIG. 2 and 3, |
| FIG. 7 | the schematic sectional representation of an individual optical system as is used with an arrangement according to FIG. 4, and |
| FIG. 8 | a block diagram of the processing of fields or intermediate images into secondary images in a computer installation according to FIG. 1. |

FIG. 1 shows an X-ray installation 1 with an X-ray tube 2 emitting X-rays passing through a patient 3 who lies on a table 4.

Below the table there is arranged a cassette or bucky 5 on which there is provided a primary image arrangement, as well as an optical arrangement 6, described in more detail in FIG. 1 and 2, for transmitting and converting a primary image 20 into electrical signals. The optical signals are supplied from the arrangement 6 to a computer installation 8 via a lead 7. In the computer 9 of the computer installation the received signals are processed and are conveyed via leads 10 to terminals 11 and/or selectively to a memory 12 or a plotter 13. The arrangement 6 for transmitting and converting the x-ray images may of course also instead of being on a cassette or a bucky 5, be fastened directly on the table 4, or held in another manner. At the same time it is essential that a primary image arrangement 21a is provided, which converts the X-rays passing through the patient into light, and that the thus produced primary image 20 may be acquired by the optical arrangement 6 and converted into electrical signals.

According to FIGS. 2 and 3 the optical arrangement 6 comprises a schematically represented optic housing 14 which is connected by way of a connection arrangement 15 to a transducer housing 16. In the optic housing 14, 16 optical systems 17 with a lens arrangement 18 are provided such that each of the lens arrangements acquires one of the segments 19 in which the primary image 20 is subdivided. The primary image 20 arises from a primary image arrangement which is formed as a scintillator 21 arranged in the bucky 5. By way of the lenses 18 of the optical systems 17, the segments 19 of the primary image 20 are in each case imaged onto a glass fiber image guide 22, wherein in each case four image guides 22 are grouped together to a row 23, 24, 25 and 26. By way of a two-part plug connection 27a and 27b, the image guides 22 are in each case connected to a transducer arrangement 28 containing an image intensifier 29 and a CCD camera 30. With the image intensifier it is the case of a MCP image intensifier (micro-channel plates), with which the electrons prevailing on the photocathode are accelerated and intensified in semiconductor channels (micro-channels), before they are again converted into light on phosphor. Image intensifiers without MCP may also be used.

The image guides are conventional glass fiber image guides consisting of coherently arranged fibers with a diameter of typically 10 micrometers or smaller, from which there results a resolution of 50 line pairs per millimeter. As a CCD camera, conventional "ICCD's" with a resolution of 1024× 1024 pixels are particularly suitable. As long as two of the transducer arrangements 28 according to FIG. 2 are to be grouped together, in order to achieve cost reduction, also only two ICCD cameras with a resolution of 2044×2033 need be provided.

The optical systems 17 or the lenses 18 are designed such that the segments 19 slightly overlap in the edge region, as can be deduced from FIGS. 5a and 60 Since the position of the lenses 18 and the connections of the image guide 22 onto the image intensifier 29 are defined, the position of the individual segments I, II, III and IV of a grouped together row within an intermediate picture 19b at the input of the image intensifier 29 or of the CCD camera 30 is known, so that the image contents after the conversion into electrical signals may easily be separated from one another. In this manner, according to the application case, in particular according to the size of the primary image 20 and the desired resolution of the image signals on the lead 7 or of the secondary image, correspondingly many optical systems 17 can be arranged in the computer 9 and, with regard to the characteristics of the transducer arrangement 28, can be grouped together to groups or sub-groups within the rows 23 to 26 or columns 31 to 34. The formation of diagonally running or other groups of optical systems acquiring geometrical fields is of course also possible and can be achieved by a corresponding interconnection of the image guides 22.

By way of the arrangement of the optical systems 17 in the optic housing 14 and the arrangement of the transducer arrangements 28 in the transducer housing 16, a single transducer housing with relatively expensive image intensifiers 29 and similarly expensive cameras 30 may be employed in order to equip various buckys 5 of one or several X-ray installations 1 in this manner for the digitalization of X-ray images. In this way, the cost of re-equipping for a radiologist may be reduced, since also with several tables only a single transducer housing 16 and a computer installation 8 is required, as long as at the same time he only operates in each case on one table. Application cases are also conceivable in which a transducer arrangement 28 is assigned to each individual image guide 22, so that the grouping together of the fields to a secondary image is effected electronically in the computer installation 8. With the arrangement according to FIG. 2, there results by way of this 16 transducers 28, this requiring a not inconsiderable additional design effort, but which is technically possible.

Figure 5C:
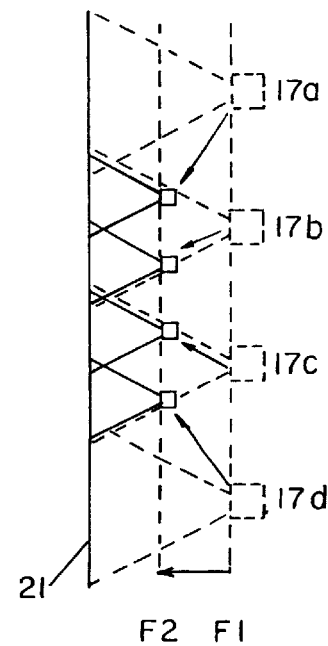

FIGS. 5b and 5c show a modified embodiment example with which the optical systems 17 are displaceable from one focus position F1 into a focus position F2. At the same time by way of a rail holding arrangement which is not shown, the distance between the scintillator 21 and thus the primary image 20 is reduced, as well as simultaneously, the distance of the optical systems 17 to one another is halved. In this way, the surface of. each segment 19a is halved which leads to a doubling of the resolution.

By way of a corresponding matching of the optical characteristics of the scintillator, optic, image guide, image intensifier and CCD cameras, a resolution typical in X-ray technology may be achieved. This is equal to or greater than 2.5 line pairs per millimeter with an image size of 400 mm×400 mm and more than 5 line pairs per millimeter with an image size of 200 mm×200 mm.

For optimizing the imaging characteristics of the complete arrangement, according to the invention it is provided for the individual segments or the fields to overlap Preferably the edge overlapping is 4 to 10% with regard to the edge length of a segment or field. The overlapping of the fields may be determined and compensated with computer processing without further ado. The overlapping is provided because the image intensifier 29 and lens arrangement 18 distort the image differently. According to FIG. 6, the objective distorts slightly barrel-shaped such that there results an image 19-1 after the lens 18. The image intensifier 29 on the other hand distorts slightly cushion-shaped, such that it represents rectangular images of the nominal shape 19-2 in the cushion-shape 19-3. The resulting image after optical acquisition and image intensification is represented accordingly as the resulting picture 19-4. From the difference D between the nominal shape 19-2 and the resulting image 19-4 there results the suggested nominal overlapping of the individual segments or fields of about 4% to 10%.

According to FIG. 4, alternatively to the individual optical systems according to FIG. 2 to 6, a larger number of microlenses 18a may be provided which are directly connected to an image guide 22a formed as a "rod lens" (gradient-index lens). According to FIG. 4, in one row or one array 26a there are arranged twenty micolenses 18a and just as many image guides 22a so that each of the microlenses acquires about 1/20 (plus overlapping) of the width of the primary image 20. The image guide 22 may be formed rigidly as well as flexibly. The interconnection of the individual microlenses and the processing in the transducer arrangement 28 is effected analogously to FIG. 2, wherein merely due to the larger number of microlenses 18a, a larger number of fields 19 and also intermediate images 19b (FIG. 5a) is produced. Arrays of this type are available on the market under the description Selfoc-Rodlenses (SRL).

For the transmission of light from the output of the image guide 22 to the input of the image intensifier 29 as well as from the output of the image intensifier 29 to the input of the CCD camera 30, a taper 28a is well proven. The output side of the image intensifier 29 comprises a larger surface than is imagable on the CCD camera 30. In order to reduce the image surface the taper 28a is employed. In order to expand the image surface from the image optcial fiber 22 onto the image intensifier 29, a taper 28a is likewise provided. Such tapers are e.g. available from the company Schott (USA) or Collimated Holes (USA) as accessories to image intensifiers. As an ICCD camera, for trials, an IL800 camera of the company Philips has been successfully applied.

FIG. 8 shows a written block diagram arrangement, from which the sequence of a calibration and an image recording is apparent.

We claim:

1. An optical arrangement for transmitting and converting X-ray images which are produced on a flat primary image arrangement (21a) with a light emission in the region of the visible spectrum, with a multitude of optical systems (17) for producing an image in each case of a field (19) corresponding to an individual segment (19, 19a) of the primary image (20), which images are led to a transducer arrangement (28) by which means the light signals can be converted into processable electrical signals, characterized in that optical image guides (22) are arranged between the optical systems (17) and the transducer arrangement (28), that the image guides (22) are grouped together in groups for combining fields (19) in each case into an intermediate image (19b) so that each intermediate image contains at least two segments of the primary image (20), and that each group of image guides (22) on the output side is connected to the input in each case of a transducer (28) of the transducer arrangement in order to lead the intermediate image (19b) concerned to this transducer.

2. An optical arrangement according to claim 1, characterized in that the optical systems (17) in each case contain a lens arrangement (18).

3. An optical system according to claim 1, in which the optical systems (17) are arranged in a matrix manner in rows and columns, characterized in that the fields (19) on the output side are grouped together column-wise and row-wise by the optical image guide (22) into intermediate images (19b).

4. An optical arrangement according to claim 1, characterized in that the optical systems (17) are displaceably arranged parallel and perpendicular to the primary image arrangement in order to image smaller or larger segments (19, 19a) of the primary image (20).

5. An optical arrangement according to claim 1, characterized in that the optical systems comprise microlenses (18a) which are directly connected in each case to an image guide (22).

6. An optical arrangement according to claim 1, characterized in that between the output of each group of image guides (22) and the assigned transducer (28), an image intensifier (29) is added.

7. An optical arrangement according to claim 6, characterized in that between the output of the group of image guides (22) and the input of the image intensifier (29) and/or between the output of the image intensifier (29) and the transducer (28), there is arranged at least one taper (28a).

8. An optical arrangement according to claim 1, characterized in that the optical systems (17) and the image guides (22) are arranged in an optic housing (14) which, as a replacement for the rear wall of a bucky (5) of an X-ray installation (1), is connectable to this bucky.

9. An optical arrangement according to claim 1 characterized in that the image guides (22), by way of a releasable, two-part plug connection (27a, 27b), are connected to the transducer arrangement (28) or an image intensifier (29).

10. An optical arrangement according to claim 1, characterized in that the transducers (28) are arranged together in a transducer housing (16).

11. An optical arrangement according to claim 1, characterized in that the optical systems (17) and the image guides (22) are arranged in an optic housing (14) which, as a replacement for the rear wall of a bucky (5) of an X-ray installation (1), is connectable to this bucky, that the image guides (22), by way of a releasable, two-part plug connection (27a, 27b), are connected to the transducer arrangement (28) or an image intensifier (29) and that the transducers (28) are arranged together in a transducer housing (16), wherein the optic housing (14) and the transducer housing (16) are releasably connected to one another by a connection arrangement (15), and wherein the one part (27b) of the plug connection (27a, 27b) is so arranged on the transducer housing (16), and the complementary second part (27a) of the plug connection is so arranged on the optic housing (14), that on connecting both housings each image guide output is connected to the assigned transducer (28) or image intensifier (29).

12. An optical arrangement according to claim 1, characterized in that the transducers (28) are cameras which convert the intermediate images (19b) into digital electrical signals, and that the cameras on the output side are connected to the input of a computer installation (8) which electronically joins together the intermediate images (19b) into complete images and from which the complete images may be outputted onto a hard copy or monitor.

13. A method for transmitting and converting X-ray primary images (20) into electrical signals, wherein the primary image (20) is broken up by a multitude of optical systems (17) into fields (19, 19a), characterized in that by way of optical means (22) at least two intermediate images (19b) are produced which in each case contain at least two of the fields (19, 19a), and that each intermediate image (19b) in each case by way of a transducer (28), is transformed into electronic image signals.

14. A method according to claim 13, characterized in that the electronic image signals corresponding to the intermediate images (19b) are led together in a computer installation for producing a secondary image.

* * * * *